US008719925B1

(12) United States Patent
Berg

(10) Patent No.: US 8,719,925 B1
(45) Date of Patent: May 6, 2014

(54) CONTENT-ADDRESSABLE MEMORY BASED ENFORCEMENT OF CONFIGURABLE POLICIES

(75) Inventor: Michael J. Berg, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 653 days.

(21) Appl. No.: 12/546,740

(22) Filed: Aug. 25, 2009

(51) Int. Cl.
*G06F 21/00* (2013.01)
*G06F 21/56* (2013.01)
*G06F 17/30* (2006.01)
*G06F 21/50* (2013.01)
*G06F 21/55* (2013.01)
*G06F 21/70* (2013.01)
*G06F 21/85* (2013.01)

(52) U.S. Cl.
CPC .............. *G06F 21/567* (2013.01); *G06F 21/56* (2013.01); *G06F 17/30985* (2013.01); *G06F 21/50* (2013.01); *G06F 21/554* (2013.01); *G06F 21/70* (2013.01); *G06F 21/85* (2013.01); *G06F 21/55* (2013.01); *G06F 21/561* (2013.01)
USPC .......................................................... 726/22

(58) Field of Classification Search
CPC ............ H04L 63/1416; H04L 63/1408; G06F 17/30985; G06F 21/50; G06F 21/554; G06F 21/70; G06F 21/85; G06F 21/567; G06F 21/561; G06F 21/56; G06F 21/55
USPC ..................................................... 726/22–24
See application file for complete search history.

(56) References Cited

U.S. PATENT DOCUMENTS

| 5,513,337 | A | * | 4/1996 | Gillespie et al. ............... 711/152 |
| 5,530,810 | A | * | 6/1996 | Bowman ........................ 710/302 |
| 6,697,276 | B1 | * | 2/2004 | Pereira et al. .............. 365/49.17 |
| 7,215,004 | B1 | * | 5/2007 | Nataraj .......................... 257/536 |
| 2005/0005153 | A1 | * | 1/2005 | Das et al. ....................... 713/200 |
| 2005/0138280 | A1 | * | 6/2005 | Kaginele ........................ 711/108 |
| 2009/0300759 | A1 | * | 12/2009 | Wang et al. ...................... 726/22 |

OTHER PUBLICATIONS

Suh et al., "Integrating Cache Coherence Protocols for heterogeneous Multiprocessor System Part 2", IEEE Computer Society, 2004, pp. 70-78 http://arch.ece.gatech.edu/pub/ieeemicro04-2.pdf.*
Berg et al., "Advanced Malware Trends", Sandia National Laboratories, Aug. 2007, pp. 1-23 Provided by the applicant.*
Michael Berg et al., "Advanced Malware Trends", Sandia National Laboratories, Aug. 29, 2007, pp. 1-23 Provided by the applicant.*

(Continued)

*Primary Examiner* — Jung Kim
*Assistant Examiner* — Carlos M De Jesus Lassala
(74) *Attorney, Agent, or Firm* — Cory G. Claassen

(57) ABSTRACT

A monitoring device for monitoring transactions on a bus includes content-addressable memory ("CAM") and a response policy unit. The CAM includes an input coupled to receive a bus transaction tag based on bus traffic on the bus. The CAM stores data tags associated with rules of a security policy to compare the bus transaction tag to the data tags. The CAM generates an output signal indicating whether one or more matches occurred. The response policy unit is coupled to the CAM to receive the output signal from the CAM and to execute a policy action in response to the output signal.

25 Claims, 6 Drawing Sheets

(56) References Cited

OTHER PUBLICATIONS

Suh et al., "Integrating Cache Coherence Protocols for heterogeneous Multiprocessor System Part 2", IEEE Computer Society, 2004, pp. 70-78 http://arch.ece.gatech.edu/pub/ieeemicroO4-2.pdf.*

Gupta, Pankaj et al., "Packet Classification on Multiple Fields", ACM SIGCOMM Computer Communication Review, 1999, 14 pages, vol. 29, Issue 4, ACM, New York, NY.

Wasti, Shubhash, "Hardware Assisted Packet Filtering Firewall", 2007, 10 pages, Department of Computer Science, University of Saskatchewan, Saskatoon, SK, Canada.

Berg, Michael, "Advanced Malware Trends", Aug. 29, 2007, 23 pages, Sandia National Laboratories, Albuquerque, New Mexico.

Brelet, Jean-Louis, "Using Block RAM for High Performance Read/White CAMs", Application Note: Virtex Series XAPP204 (v1.2) May 2, 2000, 19 pages, Xilinx, Inc., San Jose, CA.

Petroni, Jr., Nick L. et al., "Copilot—a Coprocessor-based Kernel Runtime Integrity Monitor", Proceedings of the 13th USENIX Security Symposium, Aug. 9-13, 2004, San Diego, California, 17 pages, USENIX Association.

Carrier, Brian D., "A Hardware-Based Memory Acquisition Procedure for Digital Investigations", Digital Investigation, 2003, vol. 1, 14 pages.

* cited by examiner

CONTENT-ADDRESSABLE MEMORY BASED ENFORCEMENT OF CONFIGURABLE POLICIES

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to enforcement of policies in a computing platform, and in particular but not exclusively, relates to hardware based enforcement of security policies.

BACKGROUND INFORMATION

Adversaries have a large and continually growing set of known weaknesses for software applications and the operating systems ("OS") that those applications run on. Exploiting these weaknesses has allowed adversaries to deploy viruses, worms, Trojan horses, and OS rootkits on an untold number of systems. In recent years, various researchers have begun focusing their attention on the lower layers of the hardware/software stack, expanding the set of known weaknesses into new areas.

Peripherals capable of Direct Memory Access ("DMA") can, without authorization, read the contents of the screen, search for strings or keys in memory, change data, escalate the privileges of processes, or inject code. Malicious virtual machine managers ("VMMs") exist where malicious code executes at a privilege level below the OS, thereby providing backdoor functionality that is invisible to the OS. Device firmware involved in the computer boot process has also being targeted. Malicious modifications to the boot-related firmware stored in the system's Basic Input/Output System ("BIOS"), Peripheral Component Interconnect ("PCI") expansion and option ROMs, and Extensible Firmware Interface ("EFI") have been demonstrated. Malicious modifications to this boot-related firmware can bootstrap a rootkit before the OS loads.

One potential defense against malicious rootkits, VMMs, and modified boot firmware is to use DMA to monitor system memory for unauthorized changes. One such proof-of-concept PCI device that uses DMA reads to image a host computer's memory is named "Tribble." Another prototype PCI device named "Copilot" uses DMA to detect rootkits by tracking changes to the OS kernel, loaded kernel modules (drivers), and critical data structures. While Copilot was designed to detect OS-level rootkits, the technique would also be applicable to detecting malicious VMMs.

In order to prevent devices like Tribble and Copilot detecting deeply-buried malware, a malware researcher has developed techniques that block DMA to regions of memory occupied by malware. This DMA blocking technique is possible because the system's memory controller handles memory access from the central processing unit ("CPU") and DMA-capable devices slightly differently. Malware that wishes to remain hidden changes several configuration registers in the memory controller so that the CPU still has access to the region of memory occupied by the malware, but any attempted DMA to that memory region is redirected to another location.

Another hardware-layer defense is the Trusted Platform Module ("TPM"). The TPM provides a hardware-based random number generator, protected generation and storage of cryptographic keys, "attestation" of boot process integrity, and "sealing" (encryption) of data based on attestation values. Attestation involves calculating a cryptographic hash of boot-related firmware, boot loaders, and the OS. The resulting cryptographic hashes for each stage of the boot process are compared against know good values before transferring execution to that stage. A TPM-enabled system would be capable of detecting many forms of firmware modifications.

The hardware/software stack, current and emerging threats, and conventional defenses are shown graphically in FIG. 1. As FIG. 1 illustrates, system defenders lack defenses at the lower layers of the hardware/software stack that can effectively deal with malware threats at higher layers of the stack.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
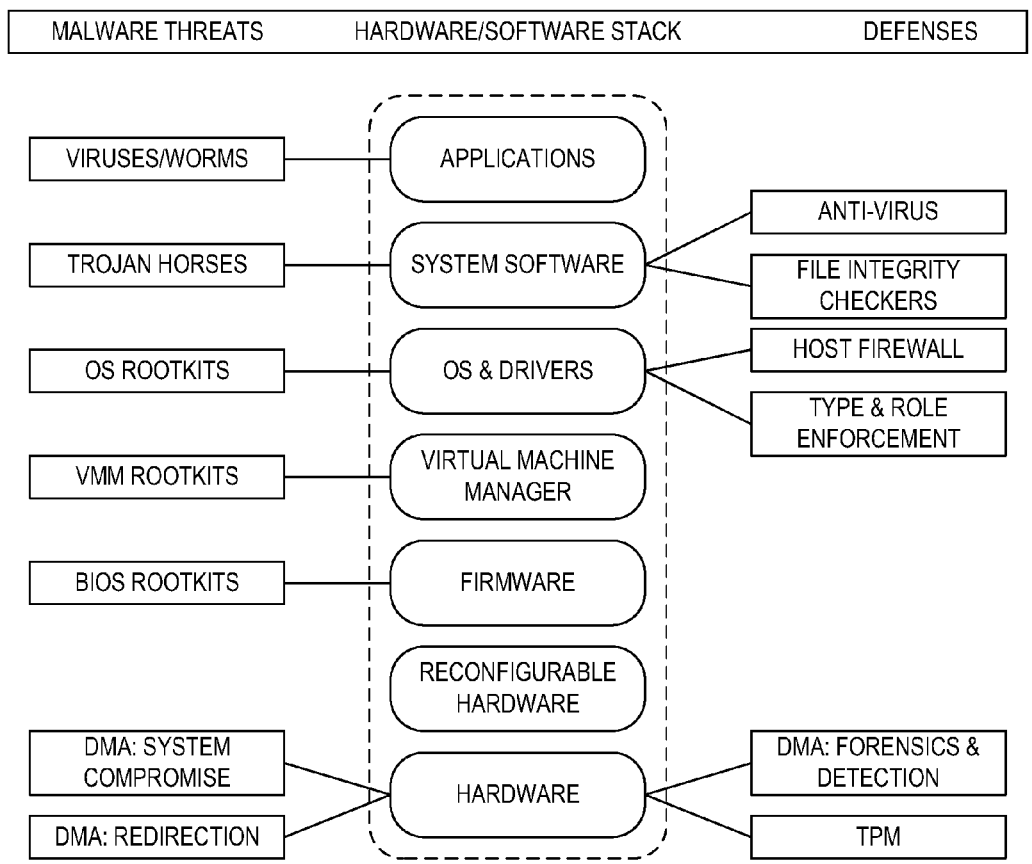
FIG. 1 (PRIOR ART) is block diagram illustrating the hardware/software stack of a computing system along with malware threats and conventional defenses against those threats.

Embodiments of a system and method for monitoring a bus for bus transactions of interest, such as suspected malicious bus transaction, are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Typical computers are composed of many different components, which connect to the motherboard and are able to interact with each other via standardized bus technologies. Bus interfaces are the primary paths for data flows into and out of system components. Those data flows follow the standardized rules defined by the bus protocol. While individual components change with every new computer system, the relatively stable bus interfaces provide good locations for deploying security solutions. Accordingly, embodiments of the present invention include one or more monitoring devices that can couple to or tap-off of the various bus interfaces within a computing system to monitor the bus for suspect bus transactions, generate a log of these suspect bus transactions, generate alerts when detecting a suspect bus transactions, and even prevent a malicious bus transactios in real-time before damage occurs.

In some embodiments, the monitoring device operates independent of the computing system being monitored. In this manner, if the computing system is subverted, the integrity of the monitoring device remains. From an independent position, the monitoring device can act as a trusted observer in an otherwise untrusted system. Embodiments of the monitoring device may have several overlapping security goals with the trusted platform module ("TPM"), but the approach is very different. A TPM is part of the system and is used at the discretion of the system. Software executing on the system sends commands and data to the TPM and uses results from the TPM. In some embodiments, the monitoring device is independent from the system being monitored, does not receive commands from the system, and can enforce protections on the system.

Each monitoring device has a limited view of the computing system from the perspective of its bus or connection interface. Thus, there may be several monitoring devices within a single computing system on different busses (e.g., system busses, peripheral busses, bus hubs, etc.) to provide the desired security services. Various monitoring devices may be combined together to create a monitoring system that coordinates the passive, reactive, and proactive protective measures within the computing system. The monitoring device or monitoring system may come in a variety of different form factors, such as slip between a motherboard and component (in-line) or attached directly to the bus.

Figure 2:
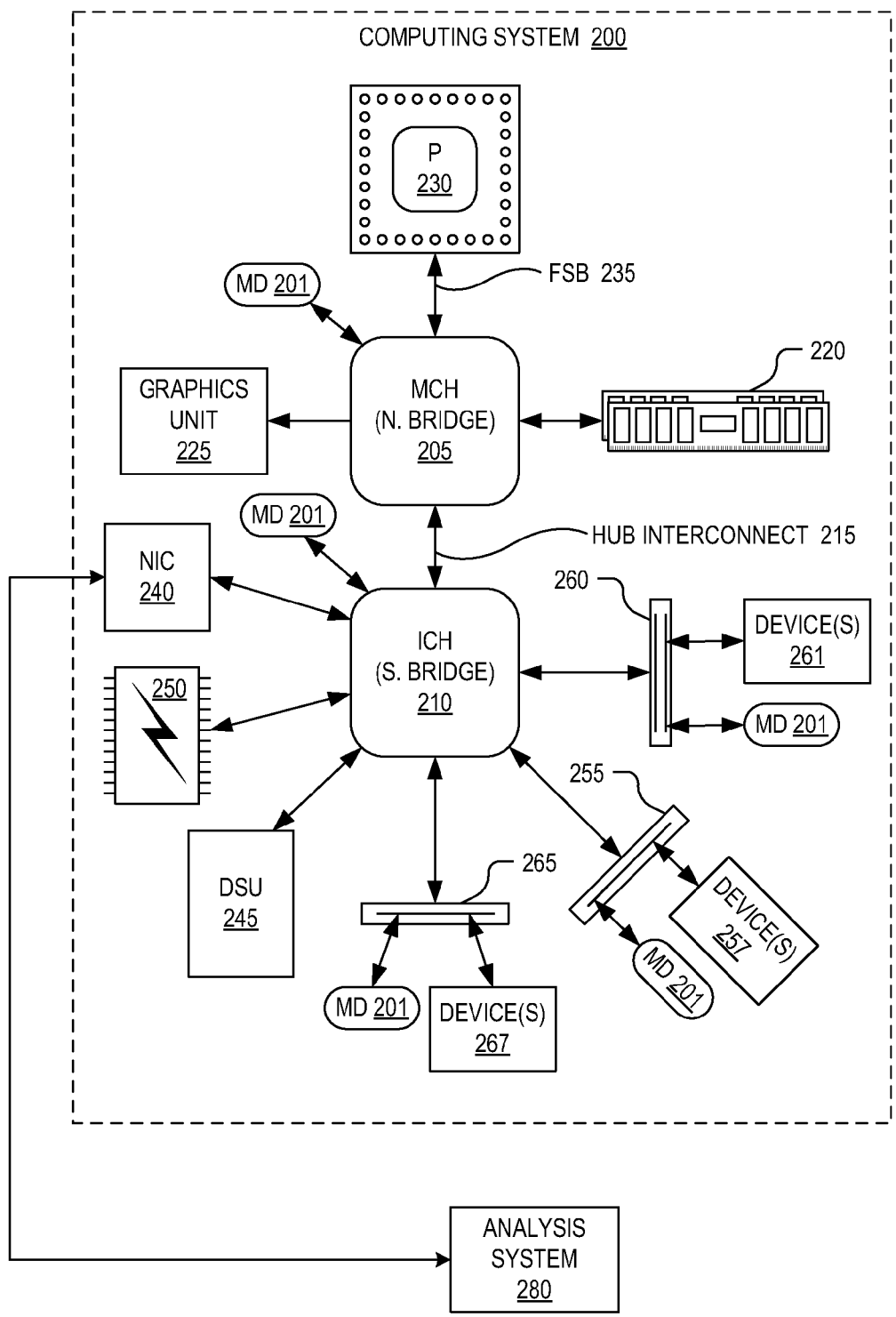
FIG. 2 is a functional block diagram of a computing system illustrating example locations for coupling a monitoring device in the computing system to monitor various buses, in accordance with an embodiment of the invention.

FIG. 2 is a functional block diagram of a computing system 200 illustrating example locations for coupling one or more monitoring devices 201 in computing system 200 to monitor various buses, in accordance with an embodiment of the invention. The illustrated embodiment of computing system 200 includes two hubs, a memory controller hub ("MCH") 205 (commonly referred to as the "north bridge") and an input/output ("I/O") controller hub ("ICH") 210 (commonly referred to as the "south bridge"), linked via a hub interconnect 215. MCH 205 couples system memory 220 and a graphics unit 225 to a processor 230 via a front side bus ("FSB") 235. ICH 110 couples a network interface card ("NIC") 240, a data storage unit ("DSU") 245, flash memory 250, a serial bus 255, parallel bus 260, and a low pin count bus ("LPC") 265 to MCH 205 via hub interconnect 215. All though FIG. 2 illustrates Intel's Hub Architecture ("IHA") for the 8xx family chipsets, it should be appreciated that monitoring devices 201 may be used in connection with a variety of other chipsets and/or computing system architectures.

Serial bus 255 couples one or more devices 257 to the remaining portion of computing system 200. Serial bus 260 may represent a variety of different serial bus technologies, such as a universal serial bus ("USB"), a Firewire or IEEE 1394 bus, a peripheral component interconnect express ("PCIe") bus, or otherwise. Parallel bus 260 couples one or more devices 261 to the remaining portion of computing system 200. Parallel bus 260 may represent a variety of different parallel bus technologies, such as, a peripheral component interconnect ("PCI"), a parallel interface (e.g., IEEE 1284 interface), or otherwise. LPC bus 265 couples one or more devices 267 to the remaining portion of computing system 200. Devices 267 may include the boot ROM, keyboard, mouse, floppy disk controller, a TPM, the infrared (IR) port, the PS/2 port, or otherwise.

As illustrated, one or more monitoring devices 201 may be coupled into computing system 200 at a variety of locations to monitor transactions flowing over the various buses. In some embodiments, monitoring devices 201 include content-addressable memory ("CAM") to identify bus traffic of interest and policy response logic to execute an appropriate policy action according to a policy. The policy may be a configurable policy (e.g., security or monitoring policy) that may be updated simply by loading new rules into the CAM and policy response logic. In one embodiment, a policy is a collection of rules that have been loaded into the monitoring device. Each rule includes a data tag in the CAM for matching against bus traffic or bus transactions and an associated policy action loaded into the policy response logic, which is executed upon matching its associated data tag. In some cases, there is a one-to-one correspondence between a data tag in the CAM and a policy action in the policy response logic. In other cases, multiple data tags may correspond to the same policy action or a match on a single data tag may trigger multiple policy actions. The various policies may include default deny or default allow policy actions when a data tag is not matched. In one embodiment, the CAM is a ternary CAM ("TCAM") capable of performing exact matches, range matches, and bit masking matches. In some embodiments, monitoring devices 201 detect and/or prevent malicious bus transactions in real-time by matching bus transactions against the data tags stored in the CAM and executing policy actions at full, protocol-matched, bus speeds.

Figure 3A:
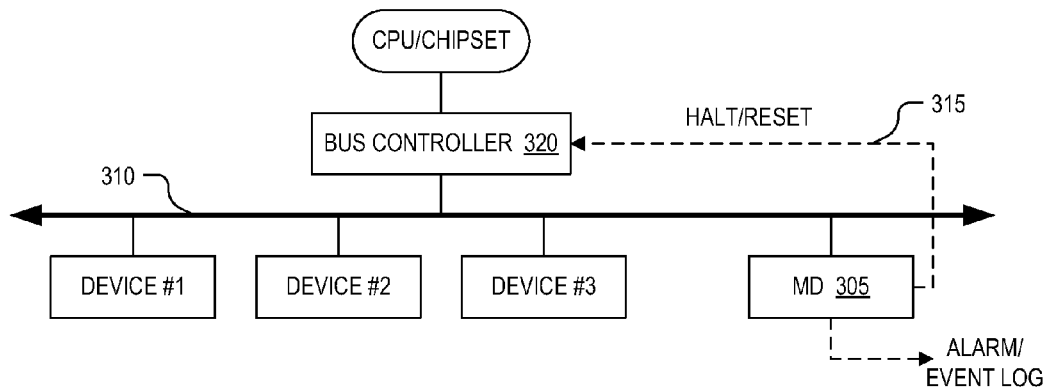
FIG. 3A is a functional block diagram illustrating a shared bus configuration incorporating a monitoring device for monitoring a bus, in accordance with an embodiment of the invention.
Figure 3B:
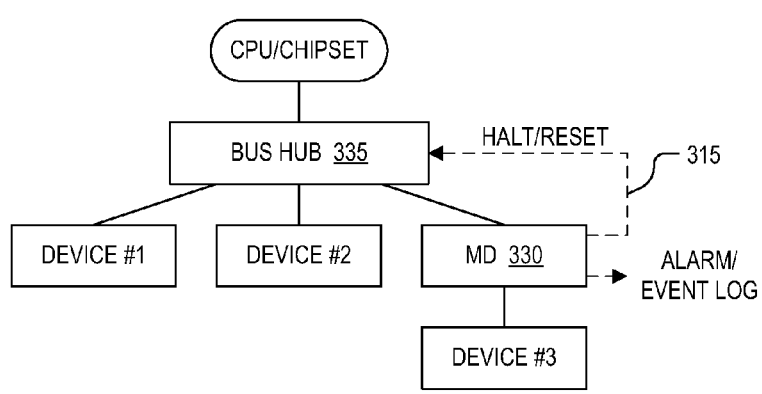
FIG. 3B is a functional block diagram illustrating an inline monitor configuration incorporating a monitoring device for monitoring a bus, in accordance with an embodiment of the invention.
Figure 3C:
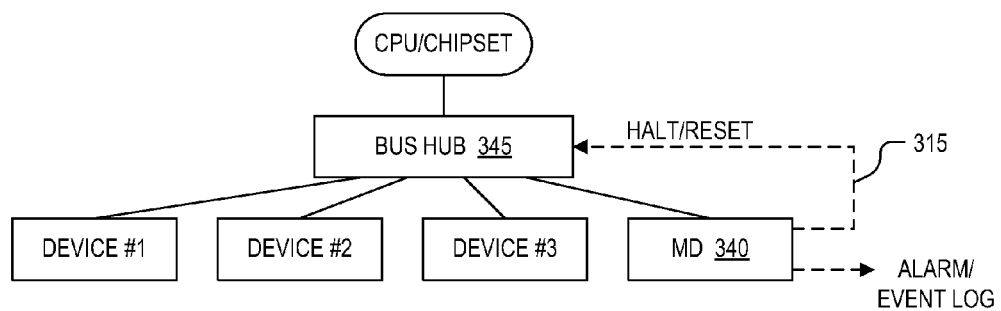
FIG. 3C is a functional block diagram illustrating an attached probe configuration incorporating a monitoring device for monitoring a bus, in accordance with an embodiment of the invention.

FIGS. 3A-3C are functional block diagrams illustrating three example configurations for incorporating monitoring devices 201 into computing system 200, in accordance with embodiments of the invention. FIG. 3A illustrates a shared bus configuration incorporating a monitoring device 305 for monitoring a bus 310. In this configuration, monitoring device 305 is capable of monitoring all bus traffic on bus 310 flowing between the central processing unit ("CPU") and devices #1-#3 or between devices #1-#3 themselves. For example, monitoring device 305 may be loaded with a security rule to permit read operations from a memory buffer within device #1, but block all write operations to that memory buffer. To block the memory operation, monitoring device 305 may issue a bus halt or bus reset signal 315 to bus controller 320 before the write operation has completed. In this manner, monitoring device 305 can protect exposed memory addresses and exposed configuration settings of devices #1-#3. In yet another example, monitoring device 305 may issue an alarm signal and/or generate an event log to record the suspect bus transaction for later inspection, analysis, or perform an audit review of a device's operation.

FIG. 3B illustrates an inline monitor configuration incorporating a monitoring device 330 for monitoring a bus hub 335. In this configuration, monitoring device 330 is capable of monitoring all bus traffic flowing between the CPU and device #3 or between device #3 and the other devices #1 or #2. As discussed above, upon identifying a suspect bus transaction, monitoring device 330 may block the transaction, issue an alarm notifying of the transaction, and/or generate an event log to record the transaction for later inspection or analysis. In this configuration, monitoring device 330 need not issue a halt or reset signal to block the transaction, since the bus transaction flows through monitoring device 330 before reaching device #3.

FIG. 3C illustrates an attached probe configuration incorporating a monitoring device 340 for monitoring a bus hub 345. In this configuration, monitor device 340 can initiate communication with other devices #1-#3 to probe for fault conditions. In the event that a fault condition is detected, monitoring device 340 can issue a bus halt or reset signal 315 to bus hub 345, generate an alarm signal, and/or generate an event log to record the fault condition for later inspection or analysis.

Figure 4:
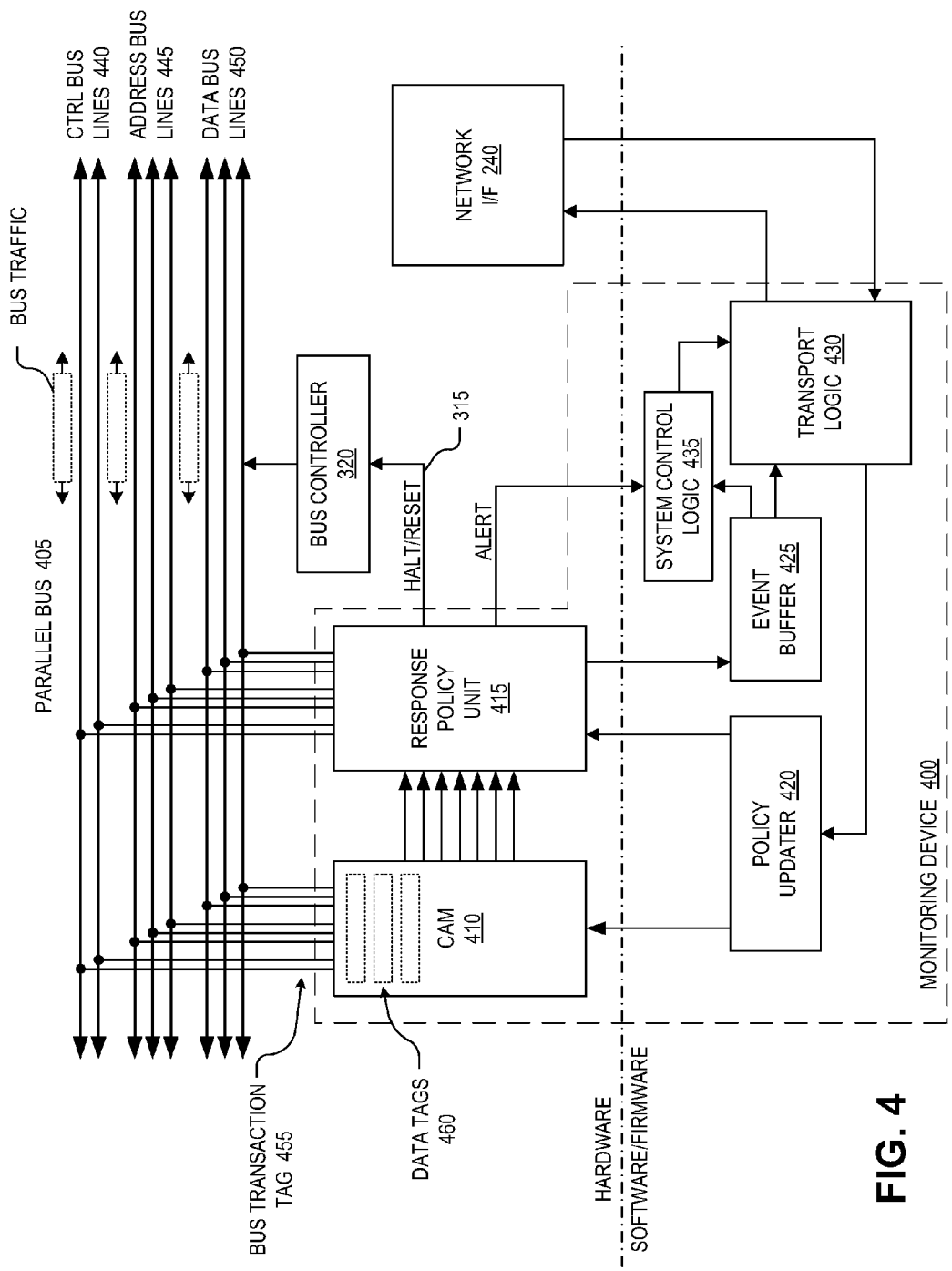
FIG. 4 is a functional block diagram illustrating a monitoring device including a content-addressable memory ("CAM") directly coupled to a parallel bus, in accordance with an embodiment of the invention.

FIG. 4 is a functional block diagram illustrating a monitoring device 400 including a content-addressable memory ("CAM") directly coupled to a parallel bus 405, in accordance with an embodiment of the invention. Monitoring device 400 represents one possible implementation of monitoring devices 201 for coupling to a parallel bus. The illustrated embodiment of monitoring device 400 includes a CAM 410, response policy unit 415, a policy updater 420, event buffer 425, transport logic 430, and system control logic 435. The illustrated embodiment of parallel bus 405 includes control bus lines 440, address bus lines 445, and data bus lines 450.

During operation, bus traffic on parallel bus 405 is monitored by monitoring device 400 for bus transactions of interest. A bus transaction may include the combination of an operation command (e.g., read, write, etc.), an address of the device being accessed (e.g., memory address, client address, etc.), and the data associated with the operation command (e.g., data read from a memory address, data being written to the memory address, protocol data, etc.). Although parallel bus 405 is illustrated as including control bus lines 440, address bus lines 445, and data bus lines 450, it should be appreciated that parallel bus 405 is merely intended as an example and embodiments of the invention may monitor other types of parallel buses with various other types of bus line functions.

In the illustrated embodiment, CAM 410 couples directly to each of the bus lines of parallel bus 405. When the data on parallel bus 405 is valid, it is input into CAM 410 as a bus transaction tag 455. Bus transaction tag 455 is compared against a set of data tags 460 stored within CAM 410. The output of CAM 410 couples to response policy unit 415 to indicate whether a match occurred between bus transaction tag 455 and one or more data tags 460, and if so, which data tag 460 was matched.

Response policy unit 415 may be implemented as configurable hardware logic, a programmable microcontroller, or otherwise. Response policy unit 415 may be programmed with a set of policy actions to execute dependent upon whether a match occurred and which match occurred. In the illustrated embodiment, response policy unit 415 is coupled to bus controller 320 to issue a halt and/or reset signal 315 to bus controller 320 dependent upon the particular policy action. Response policy unit 415 is further coupled to system control logic 435 to issue an alert signal 465 thereto. In one embodiment, system control logic 435 may represent a software application or routine executing on processor 230. System control logic 435 may be coupled to transport logic (e.g., TCP/IP network protocol stack) for communicating the alert over network interface 240 to a remote analysis system 280 (see FIG. 2) or to a remote administrator. In one embodiment, transport logic 430 executes on a processor separate from processor 230 (e.g., a processor within response policy unit 415). In one embodiment, transport logic 430 executes on processor 230.

In the illustrated embodiment, response policy unit 415 is also directly coupled to parallel bus 405 to receive and record the bus traffic associate with select bus transactions. Which bus transaction to record may be determined based upon the particular rule that is matched as determined by CAM 410. For example, the policy action of a given rule may include recording the bus traffic associated with a given bus transaction into an event log. Response policy unit 415 is further coupled to event buffer 425, which temporarily buffers one or more event logs prior to output either to an on-system memory unit (e.g., DSU 245) or off-system to analysis system 280 via transport logic 430 and network interface 240.

In the illustrated embodiment, monitoring device 400 further includes policy updater 420 for loading new configurable policies. The configurable policies may be remotely pushed into monitoring device 400 via transport logic 430 and network interface 240. A configurable policy may include monitoring rules for filtering bus transactions to identify bus transactions of interest and generate an event log of the bus transaction or security rules for identifying malicious bus transactions and even blocking such bus transactions. A policy includes a data tag loaded into CAM 410 for identifying a particular type of bus transaction and a corresponding policy action loaded into response policy unit 415 dictating the action (e.g., block transaction, issue alert, and/or record and log transaction) to be taken if the particular type of bus transaction occurs.

In this manner, CAM 410 is used to determine whether a particular bus transaction is in compliance or violation of a loaded policy and response policy unit 415 determines how to respond. Policy actions may include default allow, default deny, default log, default alert policy actions along with particular policy actions to select bus transactions. In one embodiment, CAM 410 is loaded with virus signatures for identifying bus transactions associated with known viruses (e.g., viruses that attempt to alter registry settings, write to given memory buffers, etc.). In some embodiments, CAM 410 and response policy unit 415 are protocol-speed matched to categorize the bus traffic and execute policy actions at bus speeds to fully monitor and react to consecutive bus transactions without lapse.

Figure 5:
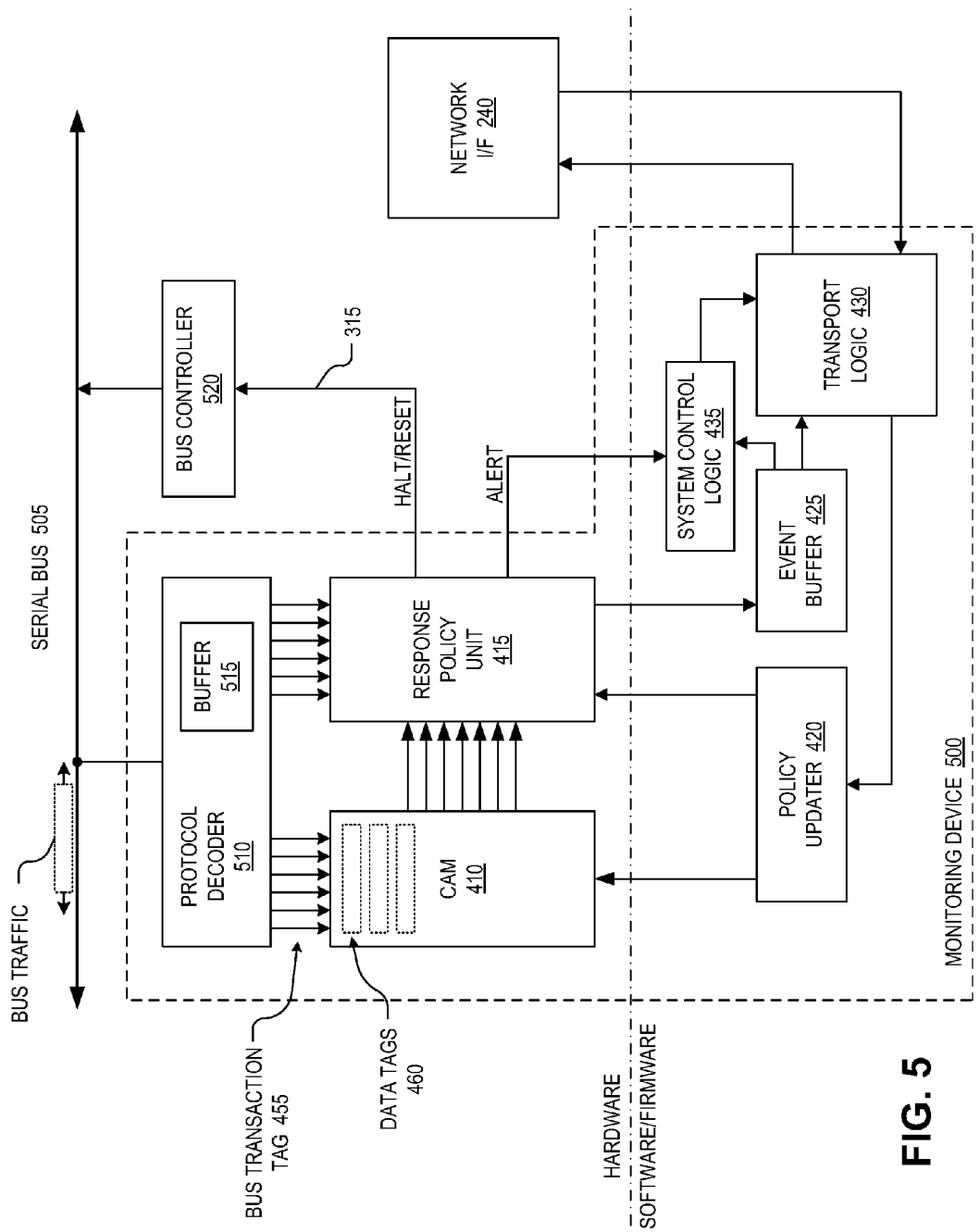
FIG. 5 is a functional block diagram illustrating a monitoring device including a protocol decoder interposed between the CAM and the bus being monitored, in accordance with an embodiment of the invention.

FIG. 5 is a functional block diagram illustrating a monitoring device 500 for coupling to a serial bus 505, in accordance with an embodiment of the invention. Monitoring device 500 includes similar components and functions in a similar way to embodiments of monitoring device 400, with at least one difference being the inclusion of a protocol decoder 510 interposed between CAM 410 and serial bus 505.

In the case of buses where a given bus transaction can occur within a single bus clock cycle, then CAM 410 and response policy unit 415 can be directly coupled to the bus, as illustrated in FIG. 4. However, if a bus transaction is spread across multiple bus clock cycles, such is often the case in serial buses, then protocol decoder 510 may be interposed. Protocol decoder 510 receives and decodes bus traffic over multiple bus clock cycles. Prior to receiving the bus traffic associated with a complete bus transaction, the bus traffic is buffered into buffer 515. Once all bus traffic associated with the given bus transaction has been buffered, protocol decoder 510 decodes the bus protocol and presents a fully decoded bus transaction tag 455 to CAM 410 and in some embodiments to response policy unit 415 as well. Although protocol decoder 510 is illustrated as only being used in connection with a serial bus, it should be appreciated that it may be applicable for use with parallel buses when their bus protocols stretch over multiple bus clock cycles.

Figure 6:
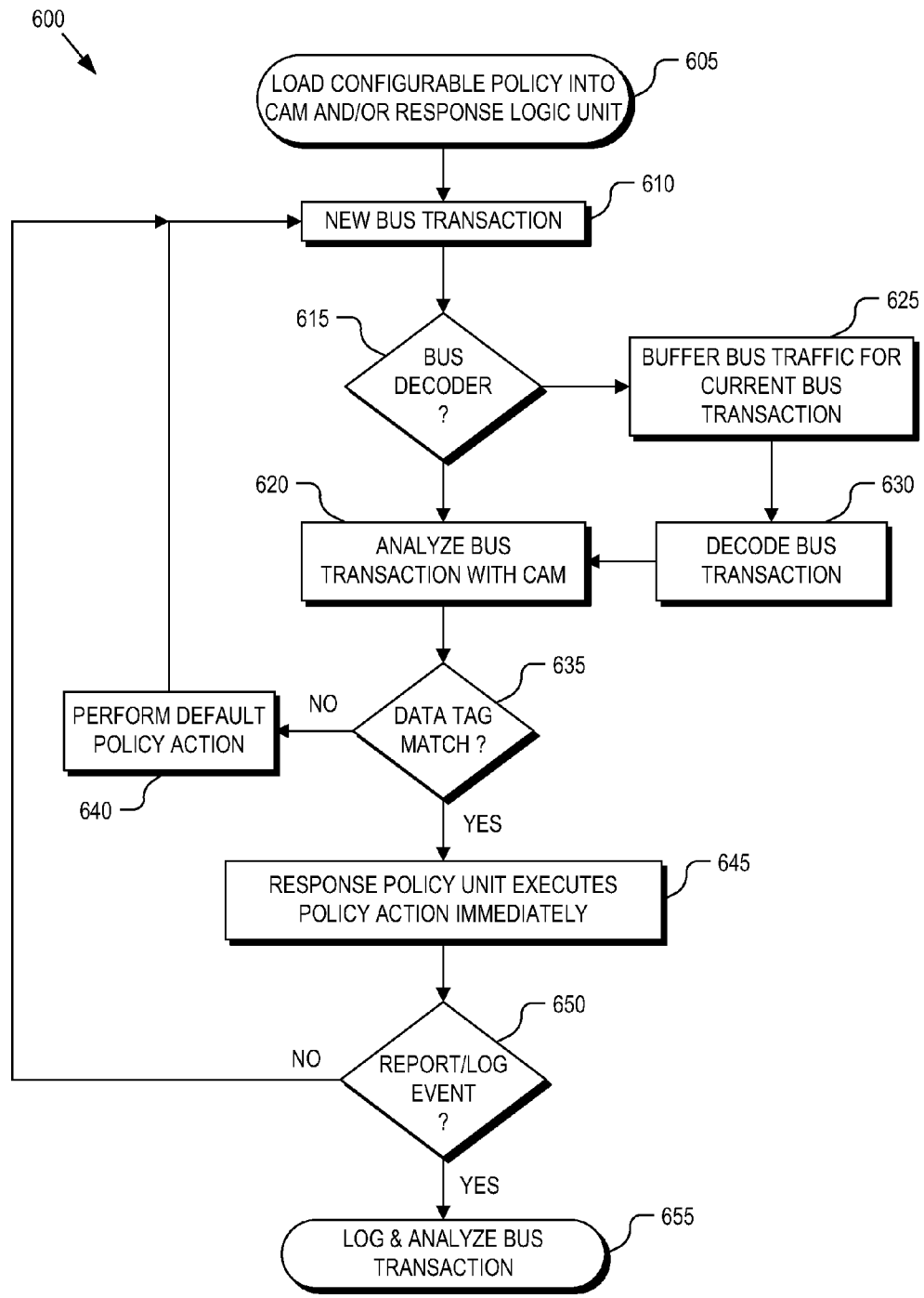
FIG. 6 is a flow chart illustrating a process of operation of a monitoring device, in accordance with an embodiment of the invention.

FIG. 6 is a flow chart illustrating a process 600 for operation of a monitoring device 210 (e.g., any of monitoring devices 305, 330, 340, 400 or 500), in accordance with an embodiment of the invention. The order in which some or all of the process blocks appear in process 600 should not be deemed limiting. Rather, one of ordinary skill in the art having the benefit of the present disclosure will understand that some of the process blocks may be executed in a variety of orders not illustrated.

In a process block 605, a configurable policy is loaded into CAM 410 and response policy unit 415. Loading a configurable policy may include updating data tags 460 within CAM 410 and updating the policy actions within response policy unit 415 associated with the data tags 460.

In a process block 610, bus traffic associated with a bus transaction is received. If monitoring device 400, which couples directly to a bus without a protocol decoder, is being used (decision block 615), then the bus traffic is immediately analyzed and compared against data tags 460 for a match (process block 620). If monitoring device 500, which couples to a bus via protocol decoder 510, is being used (decision block 615), then process 600 continues to a process block 625. In process block 625, the bus traffic is buffered for multiple bus cycles until sufficient data has been received to construct bus transaction tag 455 for lookup in CAM 410. In some embodiments, the bus traffic may be buffered until a complete bus transaction has been received. In other embodiments, the CAM lookup tag (e.g., bus transaction tag 455) may be constructed prior to receiving the complete bus transaction. For example, if responding to a disallowed write transaction, once the buffer address and write command are placed on the bus, bus transaction tag 455 may be generated to block the write transaction prior to completion. In a process block 630, the buffered bus traffic is decoded and presented to CAM 410 as a decoded bus transaction tag (e.g., including address, data, and operation). Again, in process block 620, CAM 410 compares the presented bus transaction tag against its stored data tags 460. Since CAMs are capable of simultaneously comparing an input tag against all data tags, the comparison can occur within a single bus clock cycle.

If no match occurs, then process 600 continues to a process block 640 where a default "no match" policy action is executed by response policy unit 415. The default policy action may be a "do nothing" policy, default deny, default allow, default log, default alert, or otherwise. If the current bus transaction tag 455 matches one or more of the data tags currently loaded into CAM 410, then CAM 410 indicates which rule(s) were matched by asserting select output signals to response policy unit 415.

In a process block 645, in response to receiving a match indication from CAM 410, response policy unit 415 immediately executes the appropriate policy action(s). Response policy unit 415 may execute one or more policy actions, such as, asserting a halt signal, asserting a reset signal, issuing an alert signal, generating a log report of the bus transaction, or otherwise. If a log report is to be generated (decision block 650), then response policy unit 415 may record the pertinent bus traffic into an event log, which is temporarily buffered into event buffer 425. Subsequently, the event log is output from event buffer 425 either to local storage (e.g., DSU 245) or packaged by transport logic 430 for transport over a network to remote analysis system 280 where the bus transaction can be further analyzed (process block 655).

The processes explained above are described in terms of computer software and hardware. The techniques described may constitute machine-executable instructions embodied within a machine (e.g., computer) readable storage medium, that when executed by a machine will cause the machine to perform the operations described. Additionally, the processes may be embodied within hardware, such as an application specific integrated circuit ("ASIC"), field-programmable gate array ("FPGA"), or the like.

A computer-readable storage medium includes any mechanism that provides (i.e., stores) information in a form accessible by a machine (e.g., a computer, network device, personal digital assistant, manufacturing tool, any device with a set of one or more processors, etc.). For example, a computer-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A monitoring device for monitoring transactions on a bus connecting hardware components of a computing system, the monitoring device comprising:
   a content-addressable memory ("CAM") having an input coupled to receive a bus transaction tag based on bus traffic on the bus, the CAM storing data tags associated with rules of a security policy, the CAM further coupled to compare the bus transaction tag to the data tags and to generate an output signal indicating whether one or more matches occurred; and
   a response policy unit coupled to the CAM to receive the output signal from the CAM and coupled to a bus controller of the bus, wherein the response policy unit is coupled to selectively issue a bus halt signal to the bus controller to halt the bus or to issue a bus reset signal to the bus controller to reset the bus via a signal path other than the bus, and wherein the response policy unit is coupled to issue the bus halt signal or the bus reset signal in response to the output signal from the CAM,
   and further wherein the output signal indicates to the response policy unit which of the data tags was matched when the one or more matches occurred.

2. The monitoring device of claim 1, further comprising a protocol decoder coupled between the bus and the CAM, the protocol decoder coupled to receive and decode the bus traffic from the bus and coupled to present the bus transaction tag as a decoded bus transaction to the CAM.

3. The monitoring device of claim 2, wherein the protocol decoder includes a buffer for buffering the bus traffic until a sufficient portion of the bus traffic has been received to generate the bus transaction tag for comparison against the data tags.

4. The monitoring device of claim 2, wherein the bus comprises a serial bus.

5. The monitoring device of claim 1, wherein the bus comprises a parallel bus and wherein the CAM is directly coupled to the parallel bus to directly compare the bus traffic to the data tags stored within the CAM.

6. The monitoring device of claim 1, wherein the response policy unit is coupled to the bus to receive the bus traffic and to generate a transaction log of the bus traffic in response to the output signal from the CAM such that the monitoring device operates as a bus transaction filter for identifying and logging bus transactions of interest.

7. The monitoring device of claim 6, further comprising an event buffer coupled to the response policy unit to buffer the transaction log, the event buffer coupled to communicate the transaction log to a remote analyzer system via a network interface.

8. The monitoring device of claim 1, wherein the security policy comprise a configurable security policy, the monitoring device further comprising a policy updater coupled to load new data tags into the CAM and to load new policy actions into the response policy unit.

9. The monitoring device of claim 1, wherein the CAM and the response policy unit are protocol-speed matched to categorize the bus traffic at bus speeds of the bus.

10. The monitoring device of claim 1, wherein the bus comprises one of the following: a low pin count ("LPC") bus, a peripheral component interconnect ("PCI") bus, a universal serial bus ("USB"), a PCI express ("PCIe"), a computer system bus, or an IEEE 1394 bus.

11. The monitoring device of claim 1, wherein one or more of the data tags comprises one of the following: a virus signature, a memory address of memory accessible via the bus, or the memory address combined with a write instruction to write to the memory address.

12. A method for monitoring a bus of a computing system, the method comprising:
 monitoring bus traffic on the bus, wherein the bus is external to a central processing unit of the computing system and communicatively couples the central processing unit to one or more peripheral devices;
 generating a bus transaction tag based on the bus traffic;
 comparing the bus transaction tag to a plurality of data tags within a content-addressable memory ("CAM"), the data tags for identifying bus transactions that are in compliance with or in violation of a configurable policy; and
 executing one of a plurality of policy actions associated with the data tags in response to the comparing,
 wherein the plurality of policy actions includes at least one of the following: issuing, via a signal path other than the bus, a bus halt signal to a bus controller of the bus to halt the bus or issuing a bus reset signal to the bus controller to reset the bus,
 wherein the bus halt signal or the bus reset signal are selectively generated by the response policy unit in response to the comparing.

13. The method of claim 12, wherein generating the bus transaction tag based on the bus traffic comprises:
 buffering the bus traffic in a buffer until enough bus traffic has been captured to decode the bus traffic into a bus transaction; and
 decoding the bus traffic buffered in the buffer to generate the bus transaction tag.

14. The method of claim 12, wherein the bus comprises a parallel bus and wherein the bus transaction tag comprises at least a combination of an address present on the bus and an instruction present on the bus.

15. The method of claim 12, further comprising updating the configurable policy by:
 updating one or more of the data tags stored in the CAM; and
 updating one or more of the policy actions to be executed in response to matching the one or more of the data tags.

16. The method of claim 12, wherein the plurality of policy actions includes one or more of the following: a default deny policy, a default allow policy, a log transaction policy, or an alert policy.

17. The method of claim 12, wherein the configurable policy comprises a bus transaction filter policy for identifying and logging bus transactions of interest.

18. The method of claim 12, wherein the configurable policy comprises a configurable security policy for identifying a memory access bus transaction attempting to access a protected memory location accessible via the bus and for selectively preventing the memory access bus transaction.

19. The method of claim 12, wherein at least a portion of the data tags are for identifying malicious bus transactions and at least a portion of the policy actions are for blocking malicious bus transaction in real-time prior to completion of the malicious bus transactions.

20. The method of claim 12, wherein the generating, the comparing, and the executing are protocol-speed matched to the bus transactions.

21. The method of claim 12, wherein the bus halt signal halts operation of the bus prior to completion of a bus transaction associated with the bus transaction tag or the bus reset signal resets the bus prior to completion of the bus transaction associated with the bus transaction tag.

22. A computing system, comprising:
 a host processor for executing code;
 system memory coupled to the host processor for storing the code;
 a bus for communicatively coupling the host processor to one or more peripheral devices, wherein the bus is external to the host processor; and
 a bus monitor coupled to the bus to monitor the bus for bus transactions identified by a configurable policy, the bus monitor including:
  a content-addressable memory ("CAM") having an input coupled to receive a bus transaction tag based on bus traffic on the bus, the CAM storing data tags associated with rules of a security policy, the CAM further coupled to compare the bus transaction tag to the data tags and to generate an output signal indicating whether one or more matches occurred and which of the data tags was matched when the one or matches occur; and
  a response policy unit coupled to the CAM to receive the output signal from the CAM and to execute a policy action in response to the output signal, wherein the response policy unit is coupled to issue a bus halt signal to the bus controller to halt the bus or to issue a bus reset signal to the bus controller to reset the bus via a signal path other than the bus.

23. The computing system of claim 22, further comprising a protocol decoder coupled between the bus and the CAM, the protocol decoder coupled to receive and decode the bus traffic from the bus and coupled to present the bus transaction tag as a decoded bus transaction to the CAM, wherein the protocol decoder includes a buffer for buffering the bus traffic until a sufficient portion of the bus traffic has been received to generate the bus transaction tag for comparison against the data tags.

24. The computing system of claim 22, wherein the response policy unit is coupled to the bus to receive the bus traffic and to generate a transaction log of the bus traffic in response to the output signal from the CAM such that the monitoring device operates as a bus transaction filter for identifying and logging bus transactions of interest, further comprising an event buffer coupled to the response policy unit to buffer the transaction log, the event buffer coupled to communicate the transaction log to a remote analyzer system via a network interface.

25. The computing system of claim 22, wherein the security policy comprise a configurable security policy, the monitoring device further comprising a policy updater coupled to load new data tags into the CAM and to load new policy actions into the response policy unit.

* * * * *